United States Patent [19]

Li et al.

[11] Patent Number: 5,660,684

[45] Date of Patent: Aug. 26, 1997

[54] DEINKING ELECTROSTATIC WASTE PAPER

[75] Inventors: Chin Li, Murrysville; David A. Longhini, Pittsburgh, both of Pa.

[73] Assignee: PPG Industries, Inc., Pittsburgh, Pa.

[21] Appl. No.: 620,777

[22] Filed: Mar. 22, 1996

Related U.S. Application Data

[63] Continuation-in-part of Ser. No. 304,053, Sep. 12, 1994, abandoned.

[51] Int. Cl.$^6$ ................................................. D21C 5/02
[52] U.S. Cl. ............................................................ 162/5
[58] Field of Search ........................ 162/5, 199, DIG. 4; 252/60, 172, 174.21, 174.22, 61; 510/174

[56] References Cited

U.S. PATENT DOCUMENTS

| | | | |
|---|---|---|---|
| 3,098,784 | 7/1963 | Gorman, Jr. | 162/5 |
| 3,392,083 | 7/1968 | Illingworth | 162/5 |
| 4,162,186 | 7/1979 | Wood et al. | 162/5 |
| 4,276,118 | 6/1981 | Quick | 162/5 |
| 4,376,011 | 3/1983 | Menschhorn et al. | 162/5 |
| 4,561,933 | 12/1985 | Wood et al. | 162/5 |
| 4,586,982 | 5/1986 | Poppel et al. | 162/5 |
| 4,820,379 | 4/1989 | Darlington | 162/5 |
| 4,964,949 | 10/1990 | Hamaguchi et al. | 162/5 |
| 4,971,656 | 11/1990 | Lehmann et al. | 162/5 |
| 5,100,574 | 3/1992 | Urishibata et al. | 252/174.22 |
| 5,120,397 | 6/1992 | Urushibata et al. | 162/5 |
| 5,127,573 | 7/1992 | Tsai et al. | 162/5 |
| 5,139,616 | 8/1992 | Ling | 162/5 |
| 5,141,598 | 8/1992 | Richman et al. | 162/5 |
| 5,200,034 | 4/1993 | Richmann et al. | 162/5 |
| 5,217,573 | 6/1993 | Tsai et al. | 162/5 |
| 5,228,953 | 7/1993 | Bast et al. | 162/5 |
| 5,248,388 | 9/1993 | Richmann et al. | 162/5 |
| 5,259,969 | 11/1993 | Srivatsa et al. | 252/60 |
| 5,282,928 | 2/1994 | Takabashi et al. | 162/5 |
| 5,288,369 | 2/1994 | Ishibashi et al. | 162/5 |
| 5,302,242 | 4/1994 | Richmann et al. | 162/5 |
| 5,302,243 | 4/1994 | Ishibashi et al. | 162/5 |
| 5,304,316 | 4/1994 | Urushibata et al. | 252/60 |
| 5,384,010 | 1/1995 | Hou et al. | 162/5 |
| 5,385,639 | 1/1995 | Hou et al. | 162/5 |

FOREIGN PATENT DOCUMENTS

0510954A1 10/1992 European Pat. Off. .
90/04674 3/1990 WIPO .

OTHER PUBLICATIONS

Handbook For Pulp & Paper Technologists, Gary A. Smook, 2nd Ed., 1992, Angus Wilde Publications, Bellingham, WA, pp. 214–219.

"Alkylethoxyethanesulphonates: Two Techniques For Improving Synthetic Conversions", P.K.G. Hodgson et al, JAOCS, vol. 67, No. 11 (Nov. 1990), pp. 730–732.

"A Study of the Deinking Efficiency of Nonionic Surfactants", D.W. Suwala et al, TAPPI Proceedings, 1983 Pulping Conference, pp. 533–541.

Pulp and Paper, issued Mar. 1989, R. G. Horacek et al., "Chemical Application Expands in Washing/Floatation Deinking Systems", pp. 97–99.

Pulp and Paper, issued Mar. 1990, K.E. Schriver, "Mill Chemistry Must be Considered Before Making Deink Line Decision", pp. 76–79.

"Chemistry of Flotation and Washing for Deinking Newsprint—Introduction to Deink Process Chemistry", D. McCormick, TAPPI Proceedings, 1990 Pulping Conference, pp. 357–364.

"Foaming of Non–Ionic Surface Active Agents", M. N. Fineman et al, J. Phys. Chem. 56:963 (1952), pp. 963–966.

*Interfacial Phenomena*, J. T. Davies et al, 1961, Academic Press, Ny and London, pp. 375–377, 1961.

*Defoaming*, edited by P.R. Garrett, "Surfactant Antifoams", T. G. Blease et al., Mancil Dekken, Inc., 1993, pp. 309–310.

*Primary Examiner*—Donald E. Czaja
*Assistant Examiner*—Jose A. Fortuna
*Attorney, Agent, or Firm*—Frank P. Mallak; Irwin M. Stein

[57] ABSTRACT

Describes a composition for use in flotation deinking of secondary fiber containing electrostatic ink and/or stickies and optionally conventional impact ink. The composition consists essentially of displector deinking chemicals having an HLB value greater than 10 and non-ionic surfactant deinking additives such as (i) capped aliphatic and alicyclic alkoxylates, e.g., chloride capped $C_5$–$C_{20}$ alkyl ethoxylates, (ii) alkyl phenol ethoxylates, e.g., octyl phenol ethoxylates, and (iii) a combination of (i) and (ii). Also described is a method for using the composition in a deinking process that includes a flotation step.

7 Claims, No Drawings

DEINKING ELECTROSTATIC WASTE PAPER

This application is a continuation-in-part of our application Ser. No. 08/304,053 filed Sep. 12, 1994 now abandoned.

DESCRIPTION OF THE INVENTION

The present invention relates to the flotation process for removal of ink, toner and the like from printed waste paper in the course of reclaiming the fiber content of the waste paper for reuse in the manufacture of new paper. More particularly, the present invention relates to increasing the removal efficiency of electrostatic toners and thermoplastic resin-type materials referred to as "stickies" from waste paper in flotation deinking systems. Still more particularly, the invention relates to flotation deinking additives, compositions of flotation deinking additives and displector deinking chemicals, and a method for reducing the amount of ink and/or stickies remaining in secondary fiber from flotation cells used in waste paper deinking systems.

Paper manufacture, as at present practiced, does not significantly damage or alter the character of the basic fiber from which the paper is originally made. Hence, such fiber may be recovered from used paper and reused in the manufacture of fresh paper stock. This recovered fiber is typically referred to as secondary fiber. A limitation to the practical recovery of and reuse of secondary fiber from printed waste paper is the difficulty and consequent expense of thoroughly deinking such paper.

Secondary fiber from printed waste paper has been utilized in the past for the production mainly of low grade paper and paperboard products. Today, however, due to the ever increasing world-wide scarcity in wood supply and continuously increasing energy costs, upgrading and reusing of secondary fiber has obtained greater economic and environmental importance. An increase in the use of secondary fiber is highly dependent on the quality of the reclaimed fiber, more particularly the degree of brightness possessed by the reclaimed secondary fiber and the number of visible ink particles in paper products prepared from the secondary fiber.

There are currently two principal processes for deinking paper; namely, washing and flotation. In both processes, the waste paper to be salvaged may be first cleansed of superficial dirt and shredded. The shredding operation may be conveniently performed in a hammer mill or paper shredder. Alternatively, the waste paper may be charged directly to the vessel, e.g., pulper, containing heated water, alkali reagents, such as sodium hydroxide, and an agitator, as hereinafter described. Thereafter, the waste paper (whether or not shredded) is converted to a pulp, slurry in an aqueous alkali bath with strong agitation and frequently at elevated temperatures, e.g., between 75° F. (23.9° C.) and 175° F. (79.4° C.). This process results in the defiberization of the paper and facilitates separation of the ink from the paper fibers and filler, e.g., clay, in the paper. Thereafter, the ink particles are separated from the fibers by the washing or flotation process or a combination of the two processes.

Deinking of printed paper by the flotation process is entirely different from deinking by the washing process. The washing process requires exactly the opposite conditions than that required for the flotation process, vis-à-vis, the size and the hydrophilic or hydrophobic nature of the ink particles to be separated. The hydrophilic or hydrophobic nature of the ink particle can be effected by the type of chemical adsorbed onto the surface of the ink particle. The washing process requires well dispersed hydrophilic ink particles, typically under 15 microns in size, in order to obtain efficient removal of the ink. Certain surface active agents or surfactants perform that dispersive function, thereby facilitating separation of the ink particles, together with dirt, from the fibers by washing.

The flotation process, on the other hand, involves hydrophobic ink particles ideally in the size range of 20 to 150 microns that attach onto air bubbles and are removed by a flotation step. Chemicals used in the flotation deinking process may include: collector chemicals that adsorb onto the surface of the ink particle and cause the ink particles to attach to air bubbles and float; frothing agents that ensure stability of the air bubbles; and chemical deinking agents that facilitate the separation of the ink particles from the fibers. Since certain surfactants can be strong dispersion reagents, their presence in the paper pulp is controlled in the flotation process to limit the dispersion of the ink particles. Therefore, the two processes are not comparable with each other in respect to the ink separation method or the mode of action of the chemicals used.

Since the aforedescribed washing and flotation methods have respective advantages, a combined or hybrid system utilizing both washing and flotation technology is now the preferred choice, as described in the *Handbook for Pulp and Paper Technologists* by Gary Smook, Second Edition, published by Angus Wilde Publications, 1992, page 218. The problem of process incompatibility has been overcome by the development of a new class of deinking chemicals called displectors. This term was coined from the words dispersant and collector. Although the term "DISPLECTOR" is a registered trademark of EKA Nobel AB for chemical surface active agents for use in the production of pulp and paper, it is used by the trademark owner to refer to dispersant/collector chemicals generically. See, for example, "Chemical Application Expands in Washing/Flotation Deinking Systems", by Robert G. Horacek et al, Pulp & Paper, March 1989, pp. 97–99. Displector chemicals provide enough hydrophilicity for the ink particles to remain dispersed during washing operations, and enough hydrophobicity for the ink particles to attach to air bubbles during flotation operations. Therefore, displectors perform the function of dispersive surfactants and collector chemicals in a single compound or formulation.

The deinking and reclamation of secondary fiber by the washing or flotation process has in the past been reasonably satisfactory because the source of the waste paper used in the deinking process has been reasonably uniform, and the recovered secondary fiber has been used principally in packaging materials or in applications not requiring a high degree of optical brightness. However, with the progressive depletion of natural wood resources and the ever increasing public demand to recycle paper, the type of waste paper processed by the aforesaid deinking processes has become more and more varied, and the paper deinked is generally a mixture of different types of waste paper printed with a variety of ink formulations.

A variety of materials, particularly surfactants and mixtures of surfactants are known to be useful as deinking chemicals in such processes applied to the deinking of common waste paper stock, i.e., newsprint, book, magazine, and ledger printed with conventional impact inks. Conventional impact inks are primarily water or oil based inks used in impact printing processes such as in offset printing or other mechanical printing processes. It is recognized, however, that conventional deinking processes have not been particularly successful in specific application to electrostatically printed waste paper and common waste paper stock containing the same. The difficulty encountered in the deinking of electrostatically printed waste paper has been attributed to the character of the electrostatic toner, specifically the binder, which is fundamentally different from that used in other printing processes. For example, in contrast to the common oil or resin binder of conventional impact inks, the electrostatic inks usually consist of colored pigments in a thermoplastic resin binder such as a polyester, styrene-butadiene copolymer or styrene-acrylic copolymer, which during the printing process is fixed to the paper by the application of heat. Such electrostatic toners are commonly used in laser and xerographic printing processes.

Ink formulations used in the printing industry have become more and more complex and involve increasingly the use of a wide variety of synthetic resins and polymers. Further, increasing amounts of xerographic copy paper are being used each year, and larger amounts of impact and non-impact (ink jet and laser printed computer paper) are being recycled. Such paper, together with newsprint and magazines, make up the principal sources for recycled waste paper. The ink from electrostatically printed papers will taint recycled fibers obtained from paper which was printed with conventional impact ink when conventional deinking processes are used.

Electrostatic toner particles detached from the recycled fibers during the pulping process are usually flat flakes and small ink particles. Paper prepared from such recycled fibers will have a high proportion of visible specks (or Total Dirt), i.e., ink particles having a surface area greater than about 0.002 millimeters square. This ink particle surface area range includes TAPPI Dirt, which is defined as particles having a surface area greater than 0.04 millimeters square, and Fine Dirt, which is defined as particles having a surface area less than 0.04 millimeters square. Such paper would be satisfactory for use only for the manufacture of low grade paper materials, e.g., low grade packaging cartons, tissue and towels. Therefore, papers printed with electrostatic toners are not only difficult to recycle, but their presence in common waste paper stock also reduces the quality and value of the fiber produced by conventional deinking processes.

Various processes have been disclosed for the removal of ink or toner from electrostatically or xerographically printed waste paper. The use of a dual system of a toner collector and collecting chemical is described in U.S. Pat. No. 4,276,118; a process incorporating a deinking chemical used in combination with a nonionic surfactant is described in U.S. Pat. No. 4,561,933; a composition comprising a combination of (a) aliphatic petroleum distillates, (b) alkylphenoxypoly-(ethyleneoxy) ethanol and (c) ethoxylated polyoxypropylene glycol is described in U.S. Pat. No. 5,141,598; a surfactant having a hydrophile/lipophile balance from about 0.5 to 10 is described in U.S. Pat. No. 5,200,034; and a surfactant having the formula $R_1$—$R_2$—$R_3$, wherein $R_1$ and $R_3$ are each selected from the group consisting of rosin, rosin dimers, and mixtures of rosin and rosin dimers, and $R_2$ is a polyethylene glycol is described in U.S. Pat. No. 5,217,573.

The removal of ink or toner from electrostatically or xerographically printed waste paper treated alone or in combination with non-electrostatically printed or conventional impact ink printed waste paper has also been disclosed. A method utilizing a polymeric material having a glass transition temperature in the range of from about 20° C. to about 70° C. and a substituted polyethylene oxide compound is described in U.S. Pat. No. 4,820,379; and the use of a mixture of one or more solvents, a nonionic surfactant, an anionic surfactant and water is described in U.S. Pat. No. 5,259,969.

Other thermoplastic resin-type materials similar to electrostatic toners that are common contaminants in waste paper are adhesives. Adhesive contaminants that are often found in waste paper include pressure sensitive, e.g., acrylic contact adhesives, and/or polyester hotmelt adhesive tapes, seam bindings, labels, decals, stamps, and stickers, e.g., bumper stickers. These adhesives are referred to as "stickies" in the papermaking art. Stickies are a diverse mixture of synthetic polymeric organic materials. During the pulping process, stickies are liberated from secondary fiber due to the applied mechanical and thermal energy. Stickies do not disperse well in water and if carried-over with the recovered fiber, will either end up as "dirt spots" on the paper sheets or stick onto wires, felts or paper making equipment which commonly requires the shutting down of such equipment in order to remove the stickies by solvent washing techniques. Other chemical and non-chemical methods for removing or reducing stickie contamination are described in U.S. Pat. No. 5,139,616 at column 1, line 61 to column 2, line 15.

A variety of chemical deinking agents are known to be useful in facilitating the separation of ink particles from secondary fibers and reducing stickies in the flotation process. Examples of deinking agents described in the literature that may be used include anionic surface active agents, such as alkyl-benzene sulfonates, higher alkylsulfate ester salts, α-olefin sulfonates and dialkylsulfosuccinates; and nonionic surface active agents such as ethylene oxide adducts of higher alcohols, alkylphenols, fatty acids and alkanolamides. Such deinking agents may be used either by themselves or in combination with one another. U.S. Pat. No. 5,139,616 discloses a method for reducing stickies which comprises adding to the pulp slurry at least one surfactant selected from the group consisting of fatty alkanolamides and ethoxylated compounds in addition to a hydrocarbon solvent.

U.S. Pat. No. 4,376,011 describes a composition consisting for fatty acid esters of mono- or polyhydric alcohols for use in the flotation process for removing pigments from waste paper. U.S. Pat. No. 4,971,656 describes a flotation process for deinking printed waste paper in which the waste paper is treated in a pulper with a treating solution prepared by adding to an aqueous alkaline solution an alkali-metal silicate, an oxidative bleaching agent, and an aqueous collector selected from the group consisting of an aqueous solution of an alkali metal salt of a protein fatty acid condensate, an aqueous solution of an amine salt of a protein fatty acid condensate, an aqueous dispersion of alkaline earth metal salt of a protein fatty acid condensate, or mixtures thereof.

U.S. Pat. No. 3,392,083 describes a method for deinking waste paper by the washing process that comprises the use of a nonionic detergent, e.g., alkylphenol ethoxylate, and a polyol. U.S. Pat. No. 5,228,953 describes an additive comprising a polyglycol and a complex mixture of esters formed from $C_1$–$C_{20}$ alcohols esterified with phosphoric acid for flotation deinking of waste paper. International Patent Application WO 90/04674 describes the use of amphoteric surfactants in flotation deinking of laser printed waste paper and discloses the use of ethoxylated alkylphenols in the flotation process.

Displector deinking chemicals have been described as deinking formulations that may include alkoxylates of fatty alcohols, alkoxylates of fatty acids, or combinations of both.

Various patents that disclose deinking chemicals that may be described as displectors are U.S. Pat. No. 4,964,949, which describes a deinking composition comprising an alkylene oxide adduct of a mixture of a natural oil or fat and a polyhydric alcohol, an alkylene oxide adduct of a higher alcohol, and a sulfate of the higher alcohol alkoxylate or a higher fatty acid; U.S. Pat. No. 5,120,397, which describes a reaction product obtained by reacting a natural oil or fat, or a reaction product of a natural oil or fat with glycerin, with a hexahydric alcohol to obtain an ester mixture and subsequently reacting the ester mixture with ethylene oxide and propylene oxide; and U.S. Pat. No. 5,304,316, which describes a deinking agent obtained by reacting an ethoxylated and propoxylated fatty acid or an ethoxylated and propoxylated incomplete ester of a polyhydric alcohol with a dicarboxylic acid or an anhydride thereof.

Although improvements in the deinking of electrostatically or xerographically printed waste paper treated alone or in combination with non-electrostatically printed or conventional impact ink printed waste paper with or without stickies have been achieved via the use of deinking chemicals in washing and/or flotation deinking processes, as described hereinabove, further improvements in the reduction of dirt and stickie levels are desirable and have been pursued.

It has now been discovered that the deinking of printed waste paper containing electrostatic inks, stickies, or mixtures of these materials, alone or in combination with conventional impact inks, by the novel process of the present invention results in a secondary fiber from flotation processes having lower levels of ink (dirt) and/or stickies, and may result in a higher percent recovery of fiber.

The process of the present invention relates to the deinking of fiber from waste paper wherein:

(a) an aqueous pulp slurry of fiber is produced from waste paper;

(b) the aqueous slurry of fiber is treated with chemical deinking agents, thereby to form an aqueous slurry comprising ink particulates and secondary fiber; and (c) the ink particulates are separated from the secondary fiber by a process that includes a flotation step, and involves the improvement wherein said process is performed in the presence of a deinking amount of displector deinking chemical(s) having an HLB value greater than 10 and flotation deinking additive(s) selected from the group consisting of:

(i) non-ionic surfactant material represented by the formula $R^1$—$(OC_2H_4)_m$—$(OC_3H_6)_n$—$(OC_4H_8)_p$—$R^2$, wherein $R^1$ is a $C_5$–$C_6$ cycloalkyl, $C_1$–$C_4$ substituted $C_5$–$C_6$ cycloalkyl, or a linear or branched aliphatic hydrocarbon group containing from about 5 to 20 carbon atoms, $R^2$ is a $C_1$–$C_5$ alkoxy, phenoxy, or chloro, m, n and p are each a number between 0 and 50 and the sum of m, n and p is between about 1 and 50, provided that the numerical ratio of m to n, p, or the sum of n and p, is less than 1 when m is greater than about 5;

(ii) non-ionic surfactant represented by the formula $R^3$—$C_6H_4O$—$(C_2H_4O)_t$—H, wherein $R^3$ is a $C_8$–$C_{13}$ alkyl and t is a number of between about 0.5 and about 4; and (iii) a combination of (i) and (ii), the ratio of (i) to (ii) being from 1:50 to 50:1; the ratio of said deinking displector chemical(s) to said flotation deinking additive(s) being from about 50:1 to about 1:2. The flotation deinking additives (i) and (iii) may further comprise polypropylene glycol that is greater than 50 percent water-insoluble under the conditions of flotation deinking. HLB is an abbreviation for hydrophile-lipophile balance as related to the oil and water solubility of a material. A high HLB indicates that the hydrophilic portion of the molecule is dominant, while a low HLB indicates that the hydrophobic (lipophilic) portion of the molecule is dominant. The water solubility of materials increases with increasing HLB.

DETAILED DESCRIPTION OF THE INVENTION

In accordance with the present invention, increased levels of ink, i.e., printing inks, electrostatic toners, thermoplastic resin binders, and stickies, i.e., adhesives and thermoplastic resin-type materials, are removed and higher levels of fiber may be recovered in the flotation deinking process when displector deinking chemicals, as defined herein, are used in combination with the flotation deinking additives, defined herein, as compared to when displector deinking chemicals are used alone.

More particularly, the present invention comprises a method of deinking waste paper fiber wherein an aqueous slurry of secondary fiber is produced from waste paper, the aqueous slurry of fiber is treated with chemical deinking agents, thereby to form an aqueous slurry comprising ink particulates and secondary fiber; and the ink particulates are separated from the secondary fiber by a process that includes a flotation step, which is performed in the presence of a deinking amount of displector deinking chemicals and flotation deinking additives.

Other than in the operating examples, or where otherwise indicated, all numbers expressing quantities of materials or reaction conditions used herein are to be understood as modified in all instances by the term "about".

Displector deinking chemicals of the present invention having an HLB greater than 10 include: alkoxylates of the group consisting of fats, oils, monohydric alcohols, polyhydric alcohols and mixtures thereof. The foregoing alkoxylates are formed by reacting members of the group with an amount of ethylene oxide, ethylene oxide and propylene oxide, ethylene oxide and butylene oxide, or ethylene oxide, propylene oxide and butylene oxide, that is sufficient to produce a final product having an HLB value greater than 10.0. Examples of suitable fats and oils include vegetable oils, such as coconut oil, palm oil, olive oil, soybean oil, rapeseed oil, linseed oil, castor oil and sunflower oil, animal fats, such as lard, beef tallow and bone fat, marine animal fats, such as sardine oil and herring oil, fats and oils obtained by the hardening or semi-hardening of the above fats and oils, and fats and oils recovered during the refining thereof. That is to say, fats and oils comprising triglycerides as the major component are usable herein.

Examples of the suitable monohydric alcohols to be used in the present invention include: 1-alkanols or alcohols-1, 2-alkanols or alcohols-2, unsaturated alcohols and cyclic alcohols each having 1–24 carbon atoms, e.g., octanol, nonanol, decanol, undecanol, lauryl alcohol, myristyl alcohol, cetyl alcohol, stearyl alcohol, eicosanol, oleyl alcohol, elaidyl alcohol and linoleyl alcohol and synthetic alcohols, such as methanol, ethanol, n-propyl alcohol, isopropyl alcohol, 2-ethylhexanol, 2-hexanol, cyclononanol and cyclodecanol.

Examples of suitable polyhydric alcohols include: dihydric alcohols, such as α, ω-glycols, 1,2-diols, symmetric α-glycol and cyclic 1,2-diols, each having 2–32 carbon atoms, e.g., hexane-1,2-diol, octadecane-1,2-diol, eicosane-1,2-diol, ethylene glycol, propylene glycol, butanediol, hexanediol, cyclononane-1,2-diol, butanoyl-α-glycol and hexanoyl-α-glycol; and tri- to hexahydric alcohols, such as those having 3 to 24 carbon atoms, e.g., glycerol, erythrose, erythrulose, erythritol, threose, pentaerythritol, diglycerol, arabinose, xylose, xylulose, deoxyribose, lyxose, ribulose, ribose, arabitol, ribitol, altrose, allose, galactose, gulose, mannose, glycitol, inositol, mannitol, sorbitol and tetraglycerol. Preferably, the displector deinking chemicals of the present invention include alkoxylates of fatty alcohols, i.e., fatty alcohols that have been reacted with ethylene oxide and/or propylene oxide, alkoxylates of fatty acids, or combinations of each. The fatty acids and/or fatty alcohols may be derived from animal or vegetable origin or produced by synthetic routes. The synthesis of acids or alcohols having a similar carbon chain length as fatty acids or fatty alcohols may be achieved by using petroleum feedstocks in the Oxo or Ziegler processes to produce aldehydes or alcohols, respectively, which when subjected to further oxidation would form acids.

The lipophilic portion of the fatty acid and/or fatty alcohol may comprise alkyl-, alkenyl-, hydroxyalkyl- or hydroxyalkenyl-radicals containing from about 8 to 22 carbon atoms, preferably from about 10 to 18 carbon atoms. The carbon chain may be linear, branched, even or odd numbered. When the fat is derived from natural animal or vegetable sources, the acids and alcohols generally comprise a mixture of the aforementioned lipophilic radicals. For example, a distilled mixed vegetable oil fatty acid may have the following carbon-chain distribution: about 3 percent $C_{12}$-lauric fatty acid, about 10–12 percent $C_{14}$-myristic acid, about 15–20 percent $C_{16}$-palmitic acid, about 18–25 percent $C_{18}$-stearic acid, about 45–50 percent $C_{18}$-oleic acid and about 5 percent $C_{18}$-linoleic acid.

Since the separation of ink and dirt from secondary fiber in a flotation deinking process requires foam, the displector used in flotation deinking should have a cloud point at or above the operating temperature of the flotation deinking system in which it is to foam. See page 964, column 2, the discussion beneath the heading "Correlation of Foam with Cloud Point", in "Foaming of Non-Ionic Surface Active Agents" by M. N. Fineman et al., Journal of Physical Chemistry 56:963–966 (1952).

The cloud point of a displector is related to its HLB value, i.e., the hydrophile-lipophile balance, as shown in figure 8.19 of *Interfacial Phenomena* by J. T. Davies and E. K. Rideal, Academic Press, page 376, 1961. Surfactants, e.g., displectors, with an HLB value less than 10 have cloud points below 35° C. When surfactants are used in a system operating at a temperature above their cloud point, the surfactant produces less foam and even may act as a defoaming agent. See Table 5 on page 310 of *Defoaming*, edited by P. R. Garrett, Macel Dekker, Inc., 1993.

Therefore, since paper deinking systems are operated at temperatures ranging from 75° F. (23.9° C.) to 175° F. (79.4° C.), e.g., 100° F. (38° C.), it is necessary that the displector have a cloud point at or above the operating temperature of the deinking system.

The aforedescribed patents that include deinking chemicals that may be described as displectors include: U.S. Pat. Nos. 4,964,949; 5,120,397; and 5,304,316. Commercially available products that are described as containing displector deinking chemicals include HIGH POINT® DI 2000 sold by Kao Corporation, BEROCELL® 204, 208 and 5025 sold by Eka Nobel, Inc., LIONSURF® 727 and 729 sold by Lion Industries, Inc., and FLOATSAN™ 109 and 209 sold by PPG Industries, Inc.

Flotation deinking additive(s) that may be used in the composition and process of the present invention include materials that may be represented by the following formula I:

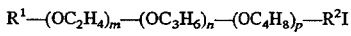

$$R^1-(OC_2H_4)_m-(OC_3H_6)_n-(OC_4H_8)_p-R^2 \text{ I}$$

wherein $R^1$ is a $C_5$–$C_6$ cycloalkyl, $C_1$–$C_4$ substituted $C_5$–$C_6$ cycloalkyl, or a linear or branched aliphatic hydrocarbon group, the hydrocarbon group is typically saturated, and preferably, $R_1$ is a $C_1$–$C_2$ substituted $C_5$–$C_6$ cycloalkyl or a hydrocarbon group containing from 5 to 20 carbon atoms; more preferably, the hydrocarbon group contains from 10 to 15 carbon atoms; —$(OC_2H_4)_m$— represents a poly(ethylene oxide) group; —$(OC_3H_6)_n$— represents a poly(propylene oxide) group; and —$(OC_4H_8)_p$— represents a poly(butylene oxide) group. The poly(ethylene oxide), poly(propylene oxide), and poly(butylene oxide) groups in the material of formulation I may be ordered or may be random, i.e., the poly(ethylene oxide) group, the poly(propylene oxide) group, and the poly(butylene oxide) groups may be in a random or block order within the molecule.

$R^2$ in formula I is selected from the group consisting of chloro, bromo, $C_1$–$C_5$ alkoxy, and phenoxy. Preferably, $R^2$ is chloro. The letters m, n and p are each a number between 0 and 50 and the sum of m, n and p is between 1 and 50 provided that the numerical ratio of m to n, p, or the sum of n and p, is less than 1, when m is greater than 5. More preferably, m, n, and p are each a number of between 0 and 30, and the sum of m, n, and p is between 1 and 30; and most preferably, m, n, and p are each a number of between 0 and 10, and the sum of m, n, and p is between 1 and 10. Particularly preferred, are materials wherein p is zero (0) and wherein m and n are each a number of between 0 and 30, and the sum of m and n is between 1 and 30; more preferably, m and n are each a number of between 0 and 10, and the sum of m and n is between 1 and 10. Most preferably n and p are zero and m is a number of between 1 and 10. The numbers for m, n, and p are average values and can be partial numbers, e.g., 9.5. A commercially available product of formula I having chloro as $R^2$ is ANTAROX® LF-330.

Procedures for the preparation of compounds of formula I having $R^2$ as chloro may involve halogenation, e.g., phosgenation, of an alcohol of $R^1$ to produce a haloformate, e.g., chloroformate, and converting the haloformate to the corresponding halide using the method of U.S. Pat. No. 4,814,524. Another method for producing the compounds of formula I having $R^2$ as chloro is by thionyl chloride chlorination of an alcohol of $R^1$ as described in "Alkylethoxyethanesulphonates: Two Techniques for Improving Synthetic Conversions" by P. K. G. Hodgson, et. al., JAOCS, Vol. 67, no.11 (November 1990). The preparation of compounds having $C_1$–$C_4$ alkoxy or phenoxy as $R^2$ may be accomplished by use of the Williamson Synthesis, which is described in *The Merck Index*, Tenth edition, published by Merck & Co., Inc., 1983, page ONR-96.

A compound similar to formula I is described in U.S. Pat. No. 4,820,379 for use in combination with a polymeric material having a glass transition temperature in the range of from 20° C. to 70° C. for deinking wastepaper. This patent describes deinking as an agglomeration of ink particles into ink globules from 2 to 5 millimeters or more in diameter which are subsequently removed by conventional means. In the present invention, agglomeration of ink particles does not occur, they remain as discrete, unagglomerated particles.

As a matter of fact, agglomeration is to be avoided in the process of the present invention since flotation ink removal efficiency decreases with increasing particle size above the ideal size range of 20 to 150 microns.

Flotation deinking additive(s) represented by formula II:

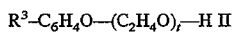

may also be used in the composition and process of the present invention. In formula II, $R^3$ may be a $C_8$–$C_{13}$ alkyl, e.g., a member selected from the group consisting of octyl, nonyl, decyl, dodecyl, and tridecyl. Preferably, $R^3$ is a $C_8$–$C_{10}$ alkyl. The group —$(C_2H_4O)_t$— represents poly (ethylene oxide), t is a number of between 0.5 and 4, and more preferably is a number from 0.5 to 2. Compounds of formula II are typically described as ethoxylated alkyl phenols and include commercially available products such as MACOL® OP-3 and NP-4; IGEPAL® CA-420, CO-210, and CO-430; and TRITON® N-42, X-15, and X-35.

The use of alkyl phenol ethoxylates as flotation agents is referred to in WO 90/04674. Specifically mentioned is the work of David W. Suwala and Harold N. Feigenbaum, "A Study of the Deinking Efficiency of Nonionic Surfactants", published in the TAPPI Proceedings reports of the 1983 Pulping Conference on page 533. The article discusses the utility of alkyl phenol ethoxylates in the deinking of waste paper and concludes that approximately 10 moles of ethylene oxide is needed in the surfactant. The alkyl phenol ethoxylates of the present invention have between 0.5 and 4 moles of ethylene oxide.

U.S. Pat. No. 3,392,083 describes the use of alkyl phenol ethoxylates having from 2 to 100 moles of ethylene oxide in combination with a polyol for deinking waste printed paper. The benefit of this combination was demonstrated in the washing process. The flotation deinking additives of the present invention benefit the flotation deinking process which is substantially different from the washing deinking process.

Polypropylene glycol flotation deinking additives that may be used include polypropylene glycols that are more oil soluble than water soluble under the conditions of use, i.e., greater than 50 weight percent of the material (based on the total weight of the polypropylene glycol added to water) is insoluble in water. The water solubility of polypropylene glycol is dependent on its molecular weight, its concentration in the deinking process fluids, and the temperature of use. For example, polypropylene glycol having a number average molecular weight of 425 is more than 50 percent water insoluble when used at a concentration of about 5 weight percent at temperatures above about 150° F. (65° C.). Polypropylene glycol having a number average molecular weight of 1200 is more than 50 percent water insoluble when used at a concentration of about 5 weight percent at temperatures above about 50° F. (10° C.) Polypropylene glycol may be used in combination with compounds of formula I or a mixture of compounds of formula I and II at a weight ratio range of from about 1 to 50 to about 50 to 1.

The use of polypropylene glycol as a component of a combination of ingredients for deinking waste paper has been described in U.S. Pat. Nos. 3,392,083 and 5,228,953. In the '083 patent, polypropylene glycol is described as a suitable polyol for use with alkyl phenol ethoxylates, and in the '953 patent, it is used with a phosphoric ester mixture as a flotation deinking additive. Also, in the '953 patent, it is disclosed that the additive may consist predominantly, in a proportion of about 60 to 100% by weight of the additive, of a polyglycol, in particular a polyglycol with a weight average molecular weight of about 1,000 to about 15,000 g/mol. In the present invention, polypropylene glycol is used only in combination with compounds of formula I or a mixture of compounds of formula I and II and the molecular weight range of water insoluble polypropylene glycol extends from below 1,000 to above.15,000 g/mol.

The amount of the composition of displector deinking chemicals and flotation deinking additives to be used in the process of the present invention is a deinking amount. Such an amount typically ranges from 0.005 to 5 weight percent, and preferably from 0.01 to 3 weight percent, and more preferably from 0.02 to 1 weight percent, based on the weight of the dry pulp fiber. The ratio of deinking displector chemicals to flotation deinking additive(s) ranges from 50:1 to 1:2, preferably from 20:1 to 1:1, and more preferably from 10:1 to 2:1, the total amount of such chemicals and additive (s) being equal to 100 percent of the composition.

In the course of conventional waste paper reclamation to form a paper stock suitable for making paper on a paper machine, the waste paper is pulped by any conventional technique in a suitable defiberizing apparatus such as a Hollander beater, or a pulper such as the one sold by the Black Clawson Co., under the trademark HYDRAPULPER. The pulping, or repulping, as it is called, consists in reducing the dry waste paper to fibrous form, with enough water to aid processing. In the pulper, the waste paper is cooked, beaten and refined in an aqueous medium, usually an alkaline aqueous medium, at temperatures in the range of 75° F. (23.9° C.) to 175° F. (79.4° C.) to effect the defiberization of the paper and to facilitate separation of the ink particles from the paper fibers and filler, e.g., the clays, associated with the paper. Alkaline reagents commonly used in this step are sodium hydroxide (caustic soda), soda ash, a mixture of lime (calcium oxide) and soda ash, or a mixture of lime and sodium silicate.

The pH of the aqueous medium in which the pulp is treated will generally be between 7.5 and 11.5, e.g., between 8.5 and 10.5. Sufficient amounts of the alkaline reagents are used to produce the desired pH. Generally, between 0.5 and 1 weight percent of sodium hydroxide, based on the dry pulp fiber, is sufficient to produce the desired pH. The consistency of the pulp in the pulper is generally between 4 and 17 weight percent. Defiberization is generally accomplished in 15 to 60 minutes.

Other chemicals that may be added to the pulper during defiberization include sodium carbonate, sodium phosphate, bleaching agents such as hydrogen peroxide, sodium hydrosulfite and sodium hypochlorite, and sequestering agents such as EDTA (ethylene diamine tetraacetic acid) and DTPA (diethylene triamine pentaacetic acid). A variety of chemical deinking agents are also used to facilitate the separation of the ink particles from the fibers and, in the case of flotation deinking, form ink particulates which may be removed by the flotation process, as distinguished from forming a dispersion of ink particles, as in the washing process. The chemical deinking agents may also be added to the pulper.

The mixture of fibers, ink particles, fillers, etc. produced in the pulper may go through a series of washing steps or it may be forwarded to a storage tank where it is diluted with water to a consistency of 2.5 weight percent. This mixture is screened to remove very large contaminants that may be found in the raw waste paper charged to the pulper. The screened pulp mixture may then be forwarded to high density cleaners wherein dense contaminants not removed in the first screening are removed. The pulp from the high density cleaner is usually diluted with water to a consistency from 0.5 to 1 weight percent and may be subjected to further cleaning and screening to remove additional contaminants.

The paper pulp suspension from the screening and cleaning steps is then subjected to the flotation process to separate the ink particles from the paper pulp suspension. Typically, the consistency of the pulp in the aqueous media subjected to flotation will be between 0.7 and 1.5 weight percent, e.g., between 1 and 1.25. weight percent (based on the dry weight of the fibers).

The pulp is then delivered to a mixing tank for adding chemicals to the pulp suspension prior to the flotation process or directly to a conventional flotation cell or series of flotation cells for separation of the ink particles by the flotation operation. Suitable flotation cells for this purpose are commercially available, as for example, the apparatus described in U.S. Pat. No. 2,005,742. Flotation equipment for this purpose is manufactured by various manufactures such as Black Clawson, Beloit, Fiberprep/Lamort, Dorr-Oliver, Bird Escher Wyss, Denver, and Voith.

The pH of the pulp subjected to flotation will typically be in the alkaline range, e.g., between 7 and 10. The temperature of the aqueous media will generally be between 75° F. (23.9° C.) and 175° F. (79.4° C.), e.g., about 100° F. (38° C.).

Flotation of the ink particles is achieved by introducing bubbles of air into the flotation cell in the presence of flotation chemicals. The bubbles may be produced by introducing air into the suspension of pulp fibers and ink particles, by saturating the suspension with air using super-atmospheric pressure and then releasing the pressure, or by drawing air into the suspension by the action of an agitator in the flotation cell. The bubbles of air in the cell rise to the surface and carry with them ink particles that attach themselves to the air bubbles, thereby causing the ink particles to float to the surface in the form of a foam or froth, which is removed from the flotation cell by skimming, suction or by allowing the froth to overflow the flotation cell into a collection zone, or by other methods known in the art. Separation of the ink particles may be enhanced by the addition of flotation chemicals. The froth from the flotation cell is dewatered, e.g., by the use of thickeners, and the water is recycled back to the paper mill. The ink and fillers comprising the froth are discarded.

The deinked suspension of fibers is removed from the flotation unit, typically passed to further cleaning operations such as screens and filters, and then often subjected to further washing, bleaching, thickening and dewatering before being used as paper stock for the preparation of new paper such as in a paper making machine.

It is contemplated herein that the flotation deinking additives may be added separately at points in the deinking process before or after the addition of displector deinking chemicals or both may be added together as a composition prior to the flotation deinking step. For example, the flotation deinking additive(s) may be added to the pulper and the displector deinking chemicals may be added to the chemical mix tank prior to the flotation process or vice versa.

In one embodiment of the present invention, pulping of a mixed office waste is conducted in a batch process at an alkaline pH with a mixture of two washing chemicals; namely, ethoxylated linear alcohols and ethoxylated alkyl phenols, each added to the pulper at a concentration of about 0.2 weight percent based on the weight of the dry fiber. After one hour of agitation in the pulper at a temperature of 120° F. (48.8° C.), the pulp slurry is transferred to a storage tank, diluted and processed through centrifugal cleaners, screens and a washing device. Afterwards, the pulp slurry is rediluted and added to a flotation chemical mix tank prior to the flotation cells. A flotation deinking additive, such as MACOL OP-3, at a concentration of 0.01 weight percent, based on the weight of the dry fiber, and a displector deinking chemical, such as HIGH POINT DI 2000 at a concentration of 0.04 weight percent, based on the weight of the dry fiber, is added to the chemical mix tank. The flotation cell is operated on a continuous basis. After deinking by flotation, the pulp slurry may be subjected to a series of cleaners, screens, washers and processes to concentrate the pulp prior to its use in a paper machine.

In another embodiment of the present invention, pulping is conducted on a continuous basis, and in place of the deinking agents specified in the previous embodiment, a composition of flotation deinking additives a) polypropylene glycol having a number average molecular weight of 1200 and b) a compound of formula I at a weight ratio of a:b of 2:5 is used. The composition also comprises the displector deinking chemical BEROCELL® 5025 at a weight ratio of displector deinking chemical to flotation deinking additive of 3:1. The composition is added to the pulper at a rate calculated to deliver 0.3 weight percent, based on the weight of the dry fiber. Further processing is conducted in a manner similar to the previous embodiment.

In still another embodiment of the present invention, a composition of a displector, such as FLOATSAN™ 109, and a flotation deinking additive comprising equal amounts of a compound of formula I, IGEPAL® CO-210, and polypropylene glycol having a number average molecular weight of 4000, at a displector to flotation deinking additive weight ratio of 2:1 is added to the flotation cell at a concentration of 0.2 weight percent, based on the weight of the dry fiber. Further processing is conducted in a manner similar to the previous embodiments.

The present invention is more particularly described in the following examples which are intended as illustrative only since numerous modifications and variations therein will be apparent to those skilled in the art.

EXAMPLE 1

A one-gallon Maelstrom laboratory pulper made by the Adriondack Machine Company was used to pulp paper samples according to the following procedure: 4085 grams of tap water and 15 grams of a 10 weight percent sodium hydroxide solution were added to the laboratory pulper and heated to about 60° C.; 300grams of a paper sample was added to the pulper; and pulping was conducted until the paper was completely defibered, which took about 15 minutes. The paper sample consisted of 150 grams of sorted, laser ink containing, white ledger, 90 grams of computer print out (CPO) having no laser ink and 60 grams of CPO printed with laser inks. The resulting pulp had a consistency of 6.8 weight percent. 441 grams of the pulp was placed in a blender and after the treatment chemicals were added, the pulp was blended for two minutes. Table 1 is a listing of the treatment chemicals used. The treated pulp samples were each placed in a large beaker, and 2559 grams of hot tap water was added to the beaker resulting in a pulp slurry having a consistency of 1 weight percent and a temperature of about 40° C. The pulp slurry was mixed and transferred into a WEMCO laboratory flotation machine cell tank. The flotation machine was fitted with a WEMCO 1+1® Roto Disperser, which was lowered into the cell tank. The rotation speed of the disperser was set to 1200 revolutions per minute.

After about 30 seconds of mixing in the flotation machine, the air valve was opened to initiate froth formation. A stopwatch was started as soon as the froth began to overflow from the discharge weir of the flotation cell. The froth was removed with a scraper into a collection pan taking care that only froth was removed. The test was ended after a predetermined flotation time interval or at the froth depletion point, i.e., the point in time at which no more froth was generated. The collected froth was dried and weighed in order to calculate the percent fiber recovered by the following calculations: the amount of fiber in the collected froth was divided by the original amount of fiber added to the flotation cell; this result was multiplied by 100 to obtain the percent fiber lost; the percent fiber lost was subtracted from 100 to obtain the percent fiber recovered.

Handsheets were prepared from the pulp slurry in the cell tank following TAPPI Method T-205 om-88, which was modified by including a step for pressing the handsheets for reflectance testing. The resulting handsheets were evaluated for a dirt level, i.e., ink and/or stickie particulates, using the camera-based Quantimet 520 by Leica, Inc., a computerized image analysis system. Prior to testing, the image analyzer was calibrated to the TAPPI Dirt Estimation Chart in TAPPI Methods T-213 and T-417. An area of 4 by 4 inches (100 by 100 millimeters) on both sides of the handsheets was scanned to generate the TAPPI Dirt count, i.e., the parts per million (ppm) of particles having a surface area greater than 0.04 millimeter square, the Total Dirt Count, i.e., the ppm of particles included in the TAPPI Dirt Count and those having a surface area less than 0.04 millimeter square, and the Fine Dirt Count, i.e., the ppm of particles having a surface area less than 0.04 millimeter square. The results are listed in Table 2.

TABLE 1

Treatment Chemicals

1. FLOATSAN™ 109—an alkoxylated fatty acid glyceride ester reported to have a HLB greater than 10.0, available from PPG Industries, Inc.
2. BEROCELL® 5025—reported to contain a displector type deinking chemical having an HLB greater than 10.0, available from Eka Nobel Inc.
3. IGEPAL® CO 210—alkyl phenol ethoxylate available from Rhone Poulenc Chimie
4. $C_{12}$–$C_{15}$ alcohol alkoxylated with an average of 3 moles of ethylene oxide and chloro capped
5. Polypropylene glycol having a number average molecular weight of 1200
6. Polypropylene glycol having a number average molecular weight of 1400
7. Polypropylene glycol having a number average molecular weight of 2000
8. Polypropylene glycol having a number average molecular weight of 4000
9. MAPEG® 200 MO—a polyethylene glycol ester with an average molecular weight of 200, of monooleate, reported to have an HLB of 8.3, and available from PPG Industries, Inc.

TABLE 2

| Treatment Chemical (Conc. - Wt. %) | Flotation Time (Min.) | % Fiber Recovered | TOTAL Dirt (ppm) | TAPPI Dirt (ppm) | FINE Dirt (ppm) |
| --- | --- | --- | --- | --- | --- |
| No. 1* (0.15) | 2 | 86.59 | 11.91 | 3.24 | 8.67 |
| No. 1* (0.15) and No. 3* (0.075) | 2 | 92.01 | 4.07 | 0.92 | 3.15 |
| No. 1* (0.15) and No. 4* (0.075) | 2 | 93.04 | 9.99 | 0.89 | 9.1 |

TABLE 2-continued

| Treatment Chemical (Conc. - Wt. %) | Flotation Time (Min.) | % Fiber Recovered | TOTAL Dirt (ppm) | TAPPI Dirt (ppm) | FINE Dirt (ppm) |
| --- | --- | --- | --- | --- | --- |
| No. 1* (0.15) and No. 6* (0.075) | 2 | 89.47 | 2.74 | 0 | 2.74 |

*The amount of Treatment Chemicals (see Table 1) added, which is indicated as a (Conc. - Wt. %), is a weight percent based on the weight of the dry pulp fiber.

The results in Table 2 show improved performance in nearly every category when the treatment chemicals Nos. 3, 4, or 6 are used in combination with the displector treatment chemical No. 1. The results for the combination of treatment chemicals 1 and 4 showed the highest percent fiber recovered but also have Fine Dirt counts somewhat higher than those found with treatment chemical No. 1 alone. These results indicate the need for considering the potential effects of combinations of treatment chemicals, e.g., Nos. 3, 4, and 1, and for decision making on trade-offs between the desired results for the variables tested, i.e., percent fiber recovered and Total, TAPPI and Fine Dirt counts.

EXAMPLE 2

The procedure of Example 1 was followed except that white water collected from a paper mill was used in place of tap water in the laboratory pulper. The results are listed in Table 3.

TABLE 3

| Treatment Chemical (Conc. - Wt. %) | Flotation Time (Min.) | % Fiber Recovered | TOTAL Dirt (ppm) | TAPPI Dirt (ppm) | FINE Dirt (ppm) |
| --- | --- | --- | --- | --- | --- |
| No. 1* (0.15) | 2 | 86.8 | 116 | 33 | 83 |
| No. 1* (0.15) and No. 3* (0.075) | 2 | 78.4 | 40 | 7 | 33 |
| No. 1* (0.15) and No. 4* (0.075) | 2 | 81.9 | 23 | 0 | 23 |
| No. 1* (0.15) and No. 5* (0.075) | 2 | 81.0 | 43 | 18 | 25 |
| No. 1* (0.15) and No. 7* (0.075) | 2 | 88.3 | 89 | 50 | 39 |
| No. 1* (0.15) and No. 8* (0.075) | 2 | 91.5 | 93 | 37 | 56 |

*The amount of Treatment Chemicals (see Table 1) added, which is indicated as a (Conc. - WT. %), is a weight percent based on the weight of the dry pulp fiber.

The results in Table 3 show reductions in all dirt counts for each of the combinations of treatment chemicals Nos. 3, 4, or 5 with the displector treatment chemical No. 1, but also show reductions in the percent fiber recovered as compared to No. 1 alone. The combination of treatment chemical 7 or 8 with No. 1 show improved levels of percent fiber recovered but had higher TAPPI Dirt counts than No. 1 alone. These results indicate a need for considering potential effects of combinations of treatment chemicals and for decision making on trade-offs between the desired results for the variables tested.

Another consideration in the scale-up of treatment programs from laboratory test results is the predictive reliability of the test. The only substantial difference between Example 1 and 2 is that white water from the paper mill, which would be used in the secondary fiber deinking and recycling process, was used in place of tap water. The difference in the performance of treatment chemicals Nos. 3 and 4, individually tested in combination with No. 1, in Tables 2 and 3 reinforces the need for evaluating the performance of treatment chemicals in a system that most closely simulates the "real world" system to be treated.

EXAMPLE 3

The procedure of Example 1 was followed except that the paper sample was obtained from a different source and the pulp was mixed in the blender for ten minutes after the addition of treatment chemicals instead of two minutes. The results are listed in Table 4.

TABLE 4

| Treatment Chemical (Conc. - Wt. %) | Flotation Time (Min.) | % Fiber Recovered | TOTAL dirt (ppm) | TAPPI dirt (ppm) | FINE dirt (ppm) |
| --- | --- | --- | --- | --- | --- |
| No. 1* (0.05) | 2.5 | 73.03 | 26.58 | 10.05 | 16.53 |
| No. 1* (0.05) and No. 3* (0.025) | 2.5 | 84.39 | 9.5 | 0 | 9.5 |
| No. 1* (0.05) and No. 4* (0.025) | 2.5 | 83.7 | 8.63 | 2.74 | 5.89 |

*The amount of Treatment Chemicals (see Table 1) added, which is indicated as a (Conc. - Wt. %), is a weight percent based on the weight of the dry pulp fiber.

The results in Table 4 show improved performance in all of the tests of the treatment chemicals Nos. 3 or 4 with No. 1 as compared with No. 1 alone.

EXAMPLE 4

The procedure of Example 1 for preparing and treating the secondary fiber and for preparing hand sheets was followed except that the waste paper sample consisted of 285 grams of paper containing laser ink from a different paper mill, 7.5 grams of AVERY® labels, and 7.5 grams of 3M Post-it® correction tape. The treatment chemicals used were No. 1 and a combination of Nos. 1 and 4. The results are listed in Table 5.

TABLE 5

| Treatment Chemical (Conc. - Wt. %) | Flotation Time (Min.) | % Fiber Recovered | TOTAL Dirt (ppm) | TAPPI Dirt (ppm) | FINE Dirt (ppm) |
| --- | --- | --- | --- | --- | --- |
| No. 1* (0.1) | 2 | 79.61 | 1717 | 1613 | 104 |
| No. 1* (0.1) and No. 3* (0.05) | 2 | 79.72 | 1490 | 1397 | 93 |
| No. 1* (0.1) and No. 4* (0.05) | 2 | 79.62 | 2172 | 2090 | 82 |

*The amount of Treatment Chemicals (see Table 1) added, which is indicated as a (Conc. - Wt. %), is a weight percent based on the weight of the dry pulp fiber.

The results in Table 5 show a greater reduction of dirt and stickie counts when treatment chemical No. 3 was used in combination with No. 1 as compared to No. 1 alone. Treatment chemical No. 4 in combination with No. 1 was less effective than No. 1 alone in removing dirt (ink) and stickies. No significant difference in percent fiber recovered for either of the combinations of No. 3 and No. 1 or No. 4 and No. 1 was found as compared to No. 1 alone. These results indicate the need for evaluating the performance of the different Treatment Chemicals of the present invention with samples from the system to be treated since the performance of the Treatment Chemicals may be effected by various components of the samples, which include inks, toners, binders, adhesives, paper coatings, etc.

EXAMPLE 5

The procedure of Example 4 was followed except that Willcopy® MP plus white paper having a basis weight of 20 pounds available from Willamette Industries, Inc. was used in place of the waste paper and the handsheets were processed using a procedure to visualize the "stickies", i.e., to make the "stickies" appear as white or translucent spots on a handsheet dyed black for reverse image analysis, since the Willcopy® paper did not contain printing ink.

The following procedure was used to visualize the "stickies": each handsheet was placed between two filter papers of comparable size and pressed with an electric iron having a heated surface of about 180° C. for about 25 seconds; each pressed handsheet was immersed for a few seconds in a 25 weight percent aqueous solution of CARTER'S black stamp pad ink in deionized water; the excess ink on the handsheet was removed by placing the dyed handsheet between blotting paper and applying pressure, and the blotted handsheet dried for about 10 minutes at about 120° C. in a William's sheet dryer. The resulting handsheets were evaluated for a "stickie" count using the camera-based Quantimet 520 by Leica, Inc., a computerized image analysis system, using the procedure for a dirt count described in Example 4. The results are listed in Table 6.

TABLE 6

| Treatment Chemical (Conc. - Wt. %) | Flotation Time (Min.) | % Fiber Recovered | TOTAL Stickie (ppm) | TAPPI Stickie (ppm) | FINE Stickie (ppm) |
| --- | --- | --- | --- | --- | --- |
| No. 1* (0.2) | 3 | 88.2 | 3009 | 2990 | 19 |
| No. 1* (0.2) and No. 3* (0.05) | 2.5 | 84.8 | 997 | 970 | 27 |
| No. 1* (0.1) and No. 4* (0.05) | 2.5 | 88.2 | 2383 | 2352 | 31 |

*The amount of Treatment Chemicals (see Table 1) added, which is indicated as a (Conc. - Wt. %), is a weight percent based on the weight of the dry pulp fiber.

The results in Table 6 show approximately a 67 percent reduction in Total and TAPPI Stickie counts when the combination of Treatment Chemical No. 3 and No. 1 was used as compared to No. 1 alone. This combination also showed a reduction in percent fiber recovered of 3.4 percent and an increase of 42 percent in the Fine Stickies. The results for the combination of Treatment Chemicals No. 4 and No. 1 showed a 21 percent reduction in Total and TAPPI Stickie counts and a 63 percent increase in Fine Stickies and no change in percent fiber recovered as compared to No. 1 alone.

EXAMPLE 6

The procedure of Example 1 was followed except that a Williams Standard Sheet Mold was used in place of the British Standard Sheet Mold and the image analysis was done using a similar procedure but scanner based equipment was used in place of camera based equipment. The results are listed in Table 7.

TABLE 7

| Treatment Chemical (Conc. - Wt. %) | Flotation Time (Min.) | % Fiber Recovered | TOTAL Dirt (ppm) | TAPPI Dirt (ppm) | FINE Dirt (ppm) |
| --- | --- | --- | --- | --- | --- |
| No. 1* (0.05) | 2 | 72 | 1567 | 1134 | 433 |
| No. 1* (0.05) and No. 3* (0.025) | 2 | 74 | 1087 | 752 | 335 |
| No. 2* (0.05) | 2 | 75 | 1344 | 1091 | 453 |

TABLE 7-continued

| Treatment Chemical (Conc. - Wt. %) | Flotation Time (Min.) | % Fiber Recovered | TOTAL Dirt (ppm) | TAPPI Dirt (ppm) | FINE Dirt (ppm) |
| --- | --- | --- | --- | --- | --- |
| No. 2* (0.05) and No. 3* (0.025) | 2 | 69 | 1151 | 774 | 377 |

*The amount of Treatment Chemicals (see Table 1) added, which is indicated as a (Conc. - Wt. %), is a weight percent based on the weight of the dry pulp fiber.

The results in Table 7 show improved dirt removal when Treatment Chemical No. 3 was used with displector Treatment Chemicals Nos. 1 or 2. A slight increase in the percent fiber recovered was found when the combination of No. 1 and No. 3 was used as compared to No. 3 alone and a decrease of about 6 percent of fiber recovered was found when the combination of No. 3 and No. 2 was used as compared to No. 2 alone.

EXAMPLE 7

Part A

Individual solutions of Treatment Chemicals 1 and 9 were prepared according to the beaker test method of U.S. Pat. No. 5,200,034, except that toner wasn't added. Specifically, 0.8224 gram of the treatment chemical was added to a beaker and deionized water, that was previously heated to 150° F., was added until the final solution weight was 1600 grams. The resulting solution contained 514 ppm of the treatment chemical. The pH of each solution was adjusted to 7.0 by adding sulfuric acid to the solution of Treatment Chemical 1 and sodium hydroxide to the solution of Treatment Chemical 9. The solutions were stirred for one hour and maintained at 150° F. on a heated magnetic stirrer prior to testing in the foam test cell of Part B.

Part B

The foam test cell consisted of a transparent cylinder of uniform diameter. The cylinder was graduated in centimeters, was open at the top, and had a small opening at the bottom. The bottom opening was connected by tubing to a pump, the discharge end of which was connected by tubing, the end of which was positioned near the rim of the top of the cyclinder. Fluid pumped through the tubing was discharged into the top opening of a smaller coaxial cylinder of uniform diameter positioned about 2.5 centimeters below the top of the transparent larger cylinder. The dimensions of the smaller cylinder were about one fourth the diameter and two thirds the height of the larger cylinder. The bottom of the smaller cylinder discharged into a test tube-like cylinder, the dimensions of which were three quarters the diameter and one third the height of the larger transparent cylinder. The bottom of the test tube was positioned about 2.5 centimeters below the discharge end of the smaller cylinder and was perforated with four (4) holes, each having a diameter of about 0.3 centimeters, to allow the fluid and foam in the test tube to flow into the larger cylinder.

A 500 ml. aliquot of each solution prepared in Part A was added to the foam test cell and the pump was turned on for 5 seconds. This was done to circulate the fluid, fill the connecting lines, and determine the height of the air liquid interface which was at the 15 centimeter mark on the cyclinder. Afterwards, the pump was turned on and the time required for the foam to reach the 20 centimeter and the 30 centimeter level was measured. The results of these studies, done in duplicate, on Treatment Chemicals (TC) 1 and 9 are listed in Table 8.

TABLE 8

Foam Build-Up
Time in seconds for foam to reach selected levels

| Level (cm.) | TC 1 | TC 1 | TC 9 | TC 9 |
| --- | --- | --- | --- | --- |
| 20 | 4 | 5 | NF* | NF* |
| 30 | 18 | 19 | NF* | NF* |

NF* - No foam formed during circulation of the sample in the foam test cell for up to 10 minutes.

The results in Table 8 show no foam formation with Treatment Chemical 9, a material similar to the ethoxylated fatty ester having an HLB of 8.0 described in Table 1 of U.S. Pat. No. 5,200,034, while the foam produced by Treatment Chemical 1 in the foam test cell reached a level of 30 centimeters in about 19 seconds.

The present invention has been described with reference to specific details of certain embodiments thereof, however, it is not intended that such details should be regarded as limitations upon the scope of the invention, except insofar as they are included in the accompanying claims.

We claim:

1. In the method for deinking secondary fiber containing electrostatic ink, stickles or a mixture of these materials wherein an aqueous slurry of secondary fiber is produced from waste paper; the aqueous slurry of secondary fiber is treated with chemical deinking agents, thereby to form an aqueous slurry comprising ink particulates and secondary fiber; and the ink particulates are separated from the secondary fiber by a process that includes a flotation step, the improvement comprising performing said process in the presence of a deinking amount of a composition consisting essentially of:
   (a) dispersant-collector deinking chemical(s) having an HLB greater than 10, and
   (b) flotation deinking additive(s) selected from the group consisting of:
      (i) non-ionic surfactant material represented by the formula $R^1$—$(OC_2H_4)_m$—$(OC_3H_6)_n$—$(OC_4H_8)_p$—$R^2$, wherein $R^1$ is $C_5$–$C_6$ cycloalkyl, $C_1$–$C_4$ substituted $C_5$–$C_6$ cycloalkyl or an aliphatic hydrocarbon group containing from about 5 to 20 carbon atoms, $R^2$ is $C_1$–$C_5$ alkoxy, phenoxy, chloro, or bromo, m, n and p are each a number between 0 and 50 and the sum of m, n and p is between about 1 and 50, provided that the numerical ratio of m to n, p, or the sum of n and p, is less than 1 when m is greater than about 5;
      (ii) non-ionic surfactant represented by the formula $R^3$—$C_6H_4O$—$(C_2H_4O)_t$—$H$, wherein $R^3$ is a $C_8$–$C_{13}$ alkyl and t is a number of between about 0.5 and about 4; and
      (iii) a combination of (i) and (ii), the ratio of (i) to (ii) being from 1:50 to 50:1; and the ratio of said displector deinking chemicals (a) to said flotation deinking additives (b) is from 50:1 to 1:2.

2. The method of claim 1 wherein said deinking amount is from about 0.005 to about 5 weight percent, based on the weight of the dry pulp fiber.

3. The method of claim 2 wherein said deinking amount is from about 0.02 to about 1 weight percent, based on the weight of the dry pulp fiber.

4. The method of claim 2 wherein said deinking dispersant-collector chemical is $C_8$–$C_{22}$ fatty acid alkoxylates, $C_8-C_{22}$ fatty alcohol alkoxylates or mixtures of $C_8-C_{22}$ fatty acid alkoxylates and $C_8-C_{22}$ fatty alcohol alkoxylates; $R^1$ is $C_1-C_2$ substituted $C_5-C_6$ cycloalkyl or an aliphatic hydrocarbon group containing from about 10 to 15 carbon atoms, $R^2$ is chloro, the letters m, n, and p are each a number of between 0 and about 30, and the sum of m, n, and p is between about 1 and 30; t is a number from 0.5 to 2; and the ratio of said dispersant-collector deinking chemicals (a) to said flotation deinking additives (b) is from 20:1 to 1:1.

5. The method of claim 4 wherein said dispersant-collector deinking chemical is $C_{10}-C_{18}$ fatty acid alkoxylates, $C_{10}-C_{18}$ fatty alcohol alkoxylates or mixtures of $C_{10}-C_{18}$ fatty acid alkoxylates and $C_{10}-C_{18}$ fatty alcohol alkoxylates; $R^3$ is a $C_{8-C10}$ alkyl; the letters m, n, and p are each a number of between 0 and about 10, and the sum of m, n, and p is between about 1 and 10; and the ratio of said dispersant-collector deinking chemicals (a) to said flotation deinking additives (b) is from 10:1 to 2:1.

6. The method of claim 1 wherein said flotation deinking additives (i) and (iii) each further comprise polypropylene glycol that is greater than 50 percent water insoluble at a temperature of between 75° F. and 175° F. and wherein the weight ratio of said deinking additives (i) or (iii) to said polypropylene glycol ranges from 1:50 to 50:1.

7. The method of claim 1 wherein said dispersant-collector deinking chemical is an alkoxylated fatty acid glyceride ester; the letters n and p are each 0 and m is a number of between 1 and about 10.

* * * * *